United States Patent
Zabler et al.

(10) Patent No.: US 6,181,021 B1
(45) Date of Patent: Jan. 30, 2001

(54) DEVICE FOR DRIVING THE TRIGGERING DEVICE OF A RESTRAINT SYSTEM

(75) Inventors: Erich Zabler, Stutensee; Anton Dukart, Woerth, both of (DE)

(73) Assignee: Robert Bosch GmbH, Stuttgart (DE)

( * ) Notice: Under 35 U.S.C. 154(b), the term of this patent shall be extended for 0 days.

(21) Appl. No.: 09/051,512

(22) PCT Filed: Oct. 7, 1996

(86) PCT No.: PCT/DE96/01921

§ 371 Date: Apr. 8, 1998

§ 102(e) Date: Apr. 8, 1998

(87) PCT Pub. No.: WO97/14583

PCT Pub. Date: Apr. 24, 1997

(30) Foreign Application Priority Data

Oct. 20, 1995 (DE) .............................. 195 39 070

(51) Int. Cl.[7] .................................................. B60R 21/16
(52) U.S. Cl. .................. 307/10.1; 180/282; 280/728.1; 340/310.07; 701/45
(58) Field of Search .................................. 307/9.1, 10.1, 307/121, 104; 340/310.07; 439/950; 180/274, 282, 279; 280/734, 735, 728.1, 801.1, 806; 701/45–47; 333/177

(56) References Cited

U.S. PATENT DOCUMENTS 5,515,399 * 5/1996 Swart ................................... 333/177
5,856,710 * 1/1999 Baughman et al. ................ 307/10.1

FOREIGN PATENT DOCUMENTS 24 33 555 A1  1/1976  (DE).
0283188    *  9/1988  (EP).
58-115945     7/1983  (JP).

* cited by examiner

Primary Examiner—Albert W. Paladini
(74) Attorney, Agent, or Firm—Kenyon & Kenyon

(57) ABSTRACT

An arrangement for activating a deployment mechanism of a restraint system includes a transfer unit whose secondary side is connected to the deployment mechanism. In order to prevent improper deployments of the restraint system, upstream from the deployment mechanism there is an electrical energy accumulator which is fed by a charging current delivered via the transfer unit. In addition, on the secondary side there is connected to the transfer unit a control circuit which, in reaction to a trigger signal that, in a situation requiring deployment of the restraint system, is delivered from the transfer unit, switches the electrical energy accumulator though to the deployment mechanism.

8 Claims, 1 Drawing Sheet

DEVICE FOR DRIVING THE TRIGGERING DEVICE OF A RESTRAINT SYSTEM

BACKGROUND OF THE INVENTION

1. Field of the Invention

The present invention relates to an arrangement for activating a deployment mechanism of a restraint system for vehicle occupants; specifically the deployment mechanism is connected to a secondary side of a transfer unit.

2. Background Invention

A restraint system is described in German Patent No. DE 24 33 555 A1. The restraint system described is an airbag arranged in a steering wheel. In order to bypass the complex and failure-prone slip rings or volute springs previously used to transfer signals between a control unit located on the vehicle chassis and the deployment mechanism (firing pellet) installed in the airbag, according to this existing art a rotary transfer unit is used, whose primary and secondary windings are arranged rotatably with respect to one another about the steering wheel axis. The firing pellet of the airbag is connected to the secondary winding, and the primary winding is connected via a switch to a battery of the vehicle. By means of pulses fed in on the primary side, a voltage which leads to deployment of the firing pellet is induced in the secondary winding. In order for the voltage induced in the secondary winding to be great enough to deploy the firing pellet, the magnetic coupling between the primary and secondary windings of the transfer unit must be very high. A high magnetic coupling is achieved by embedding both windings in ferromagnetic coil elements. A transfer unit of this kind is capable of receiving a great deal of energy, even if its winding terminals erroneously come into contact with the vehicle's voltage lines. In some circumstances, however, this energy is already sufficient to deploy the airbag. Improper deployment of this kind should, however, be prevented in all cases.

In German Patent No. DE 44 04 816 A1, an arrangement for activating a deployment mechanism of a restraint system is described in which the supply voltage for the deployment mechanism is transferred directly from the primary side to the secondary side of a transformer. A voltage regulator prepares the voltage transferred to the secondary side for the deployment mechanism and for other electronic circuits on the secondary side. As a result, a relatively high supply voltage must continuously be transferred via the transformer, which in turn requires a high magnetic coupling—associated with the aforementioned disadvantages—between the primary and secondary windings of the transformer.

SUMMARY OF THE INVENTION

An object of the present invention is to specify an arrangement of the kind cited initially which is capable of preventing improper deployments of a restraint system to which the deployment signal is delivered via a transfer unit.

According to the present invention, the object is achieved by the fact that upstream from the deployment mechanism is an electrical energy accumulator, for example a capacitor, which is fed by a charging current delivered via the transfer unit. This makes it possible to use a transfer unit which contains very little or even no ferromagnetic material, so that the magnetic coupling between the windings is very low, and it is therefore not capable of receiving an amount of energy that would be sufficient to deploy the restraint system with a pulse. The deployment system is thus fired solely by the energy charged in the energy accumulator. In order to deploy the restraint system, a low-power trigger signal is transferred from the transfer unit to a control circuit, connected to the secondary side, which switches the energy accumulator through to the deployment mechanism. A transfer unit of this kind, which contains little or even no ferromagnetic material, also has the advantage that it possesses little weight and requires little installation space.

According to the present invention, the control circuit connected on the secondary side to the transfer unit can also be used to monitor the charge status of the electrical accumulator, and also to check the function of the deployment mechanism by means of a resistance measurement and, if the resistance deviates from a defined value, to send an error signal back via the transfer unit to a control unit. It is advantageous to bypass the electrical accumulator with a switch which short-circuits and thereby discharges the energy accumulator if the restraint system is not built into a vehicle. To allow the control circuit to distinguish the trigger signal from the energy accumulator charging current, both of which are induced by the transfer unit on the secondary side, the trigger signal should have a frequency or duration or digital code which is recognizable by the control circuit.

DETAILED DESCRIPTION

Figure 1:
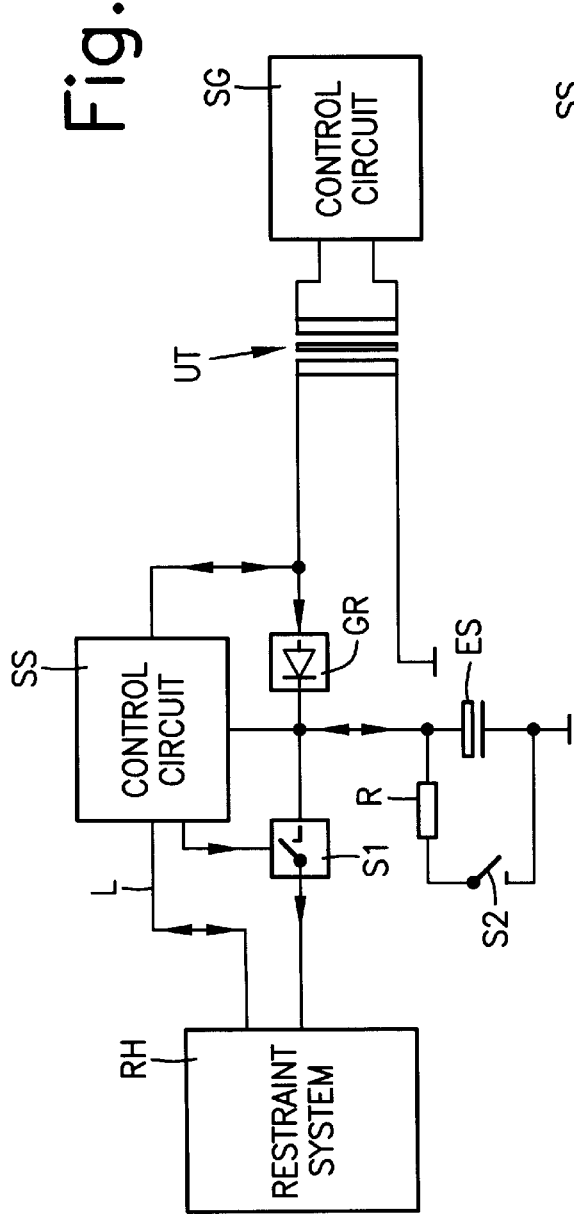
FIG. 1 shows an exemplary arrangement for activating the deployment mechanism of a restraint system by means of a transfer unit according to the present invention.

FIG. 1 depicts a circuit for activating the deployment mechanism of a restraint system for the occupants of a vehicle. The restraint system, symbolized here by a circuit block RH, can be, for example, an airbag or a seat-belt tensioner. Deployment and functional monitoring of the deployment mechanism of restraint system RH is usually handled by a control unit SG (not described here in further detail), which is arranged separately from the restraint system at a suitable point on the vehicle chassis. Signal transfer between control unit SG and restraint system RH is handled by a transfer unit UT. The latter can be configured as a rotary transfer unit whose primary and secondary windings are mounted rotatably or displaceably with respect to one another. Signals can thereby be transferred, in a galvanic and noncontact manner, to a restraint system which is installed in a vehicle part (e.g. steering wheel) that is movable with respect to the vehicle chassis. Transfer unit UT used here contains very little or even no ferromagnetic material, so that it is incapable, even in the event of undesired contact between its terminals and the vehicle's voltage line, of receiving sufficient energy to deploy the restraint system. To ensure that in an emergency, a firing energy sufficient for the deployment of restraint system RH can nevertheless be delivered to it within a period of at most one millisecond, an electrical energy accumulator ES, for example a capacitor, is connected to transfer unit UT on the secondary side. A low-power AC voltage signal delivered from transfer unit UT is rectified by a rectifier GR upstream from capacitor ES, and capacitor ES is charged with this direct current. Charging of capacitor ES takes place immediately after ignition of the vehicle's engine with a switched on, a charging time constant of several seconds being acceptable. During operation of the vehicle, the charging current delivered by transfer unit UT ensures continuous recharging of capacitor ES to an energy level which is necessary for rapid deployment of restraint system RH.

Located between the deployment mechanism for restraint system RH and capacitor ES is a switch S1, preferably an electronic switch, e.g. a transistor or thyristor. When this switch S1 is closed, capacitor ES discharges via the deployment mechanism of restraint system RH. At the beginning of the discharge operation, the discharge current of capacitor ES is so high that it deploys restraint system RH with minimal delay. Ensuring that switch S1 is closed only when necessary is a control circuit SS which is also connected on the secondary side prior to rectifier GR. The reaction of this control circuit SS to a trigger signal delivered by transfer unit UT, is to close switch S1. This trigger signal, like the charging current for capacitor ES, is a low-energy signal, but must differ in clearly recognizable fashion from the charging current for capacitor ES. The differentiation criterion can be, for example, a certain frequency or a defined duration or a selected digital code, which is recognized in error-free fashion by control circuit SS.

Control circuit SS can also, in addition to actuation of switch S1, handle a monitoring function for the charge status of capacitor ES. If the charging of capacitor ES should be defective, control circuit SS emits a corresponding signal to transfer unit UT which is detected by control unit SG connected on the primary side. In addition, control circuit SS can also be utilized to monitor the operation of the deployment mechanism of restraint system RH. A connecting line L is therefore provided between restraint system RH and control circuit SS. Monitoring of the deployment mechanism consists, for example, in the fact that the resistance of the firing pellet is measured by control circuit SS, and if a predefined resistance value is exceeded, it sends out an error signal, also via transfer unit UT, to control unit SG, signaling the malfunction to the driver of the vehicle.

Figure 2:
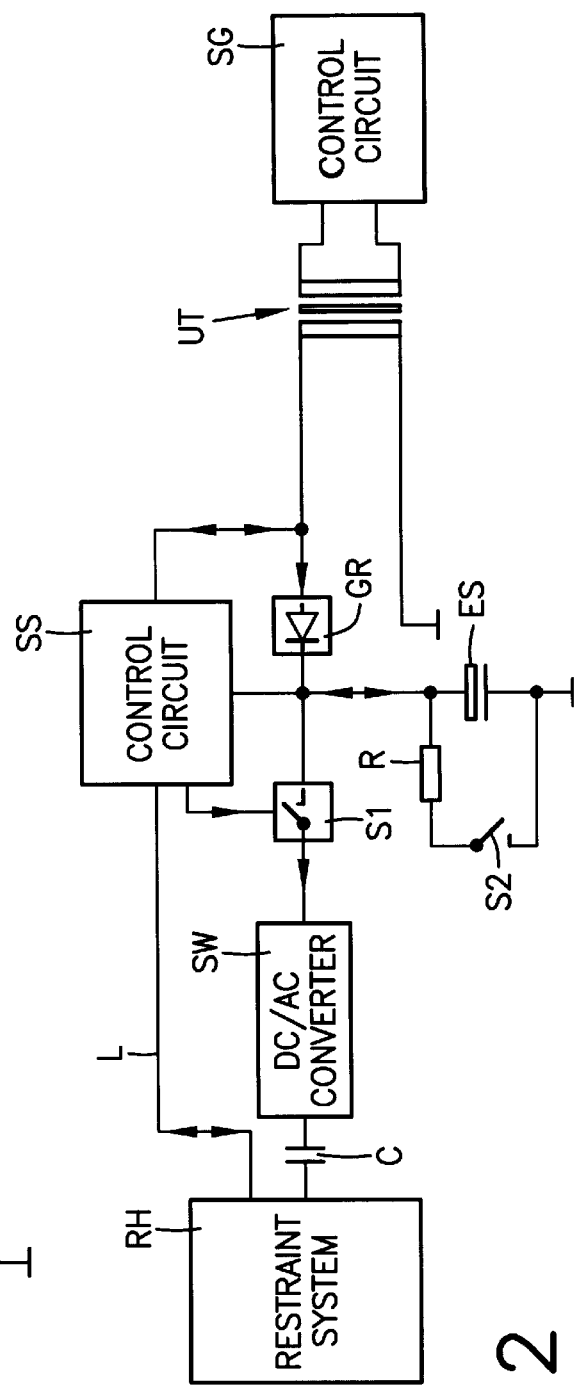
FIG. 2 shows an exemplary arrangement for activating the deployment mechanism of a restraint system using an alternating current according to the present invention.

Although, according to the activation circuit depicted in FIG. 1, restraint system RH is fired by a direct current, an AC firing system can also be provided. For this purpose, in the activation circuit depicted in FIG. 2 (which otherwise is identical to the circuit described previously), a DC/AC voltage converter SW and a coupling capacitor C are inserted between switch S1 and restraint system RH.

Capacitor ES is bypassed by a switch S2 which short-circuits and thereby discharges capacitor ES if restraint system RH is not properly installed in a vehicle. This switch S2 would thus need to close automatically if restraint system RH, together with the activation circuit, were removed from the vehicle. This prevents improper deployment of restraint system RH, for example due to interference signals or unintentional contacts, when the capacitor is still charged. Connected in series with switch S2 is a resistor R through which capacitor ES can discharge when switch S2 is closed. Switch S2 could also be actuated by means of control circuit SS as soon as the latter determines that, after a certain period of time, no further charging current is flowing from the transfer unit into capacitor ES. This criterion thus indicates that the restraint system, together with the activation circuit, either is defective or is not even installed in the vehicle.

What is claimed is:

1. An arrangement for activating a deployment mechanism of a restraint system for vehicle occupants, comprising:
    a transfer unit, wherein the deployment mechanism is connected to a secondary side of the transfer unit;
    an electrical energy accumulator for receiving a charging current via the transfer unit, wherein the electrical energy accumulator is located upstream from the deployment mechanism; and
    a control circuit connected to the secondary side of the transfer unit for switching the electrical energy accumulator through to the deployment mechanism to deploy the restraint system, wherein the switching occurs in response to a trigger signal delivered from a primary side of the transfer unit via the transfer unit.

2. The arrangement according to claim 1, wherein an electromagnetic energy received by the transfer unit is limited by a magnetic coupling of the transfer unit, and wherein the electromagnetic energy received by the transfer unit is not sufficient to deploy the restraint system.

3. The arrangement according to claim 1, wherein the transfer unit includes a primary winding and a secondary winding, wherein one of the primary winding and the secondary winding is mounted one of rotatably and displaceably with respect to the other one of the primary winding and the secondary winding.

4. The arrangement according to claim 1, wherein the control circuit monitors a charge status of the electrical energy accumulator.

5. The arrangement according to claim 1, wherein the electrical energy accumulator includes a capacitor.

6. The arrangement according to claim 1, further comprising a switch for bypassing the electrical energy accumulator when the restraint system is not installed in a vehicle, wherein the switch short-circuits the electrical energy accumulator causing the electrical energy accumulator to discharge.

7. The arrangement according to claim 1, wherein the transfer unit cannot transfer a signal having sufficient energy to activate the deployment mechanism.

8. An arrangement for activating a deployment mechanism of a restraint system for vehicle occupants, comprising:
    a transfer unit, wherein the deployment mechanism is connected to a secondary side of the transfer unit;
    an electrical energy accumulator for receiving a charging current via the transfer unit, wherein the electrical energy accumulator is located upstream from the deployment mechanism;
    a control circuit connected to the secondary side of the transfer unit for switching the electrical energy accumulator through to the deployment mechanism to deploy the restraint system, wherein the switching occurs in response to a trigger signal delivered via the transfer unit; and
    a converter for converting a discharge current of the electrical energy accumulator into an alternating current, wherein the discharge current flows from the electrical energy accumulator to the deployment mechanism.

* * * * *